(12) United States Patent
Ahnert et al.

(10) Patent No.: US 8,029,014 B2
(45) Date of Patent: Oct. 4, 2011

(54) STROLLER WITH SYNCHRONIZED SEAT HEIGHT ADJUSTMENT

(75) Inventors: Stephen Ahnert, Philadelphia, PA (US); Daniel Newhard, Lititz, PA (US); Derek Saville, Stockton, CA (US); John (Jason) C. Arnold, IV, Philadelphia, PA (US)

(73) Assignee: Graco Children's Products Inc., Exton, PA (US)

( * ) Notice: Subject to any disclaimer, the term of this patent is extended or adjusted under 35 U.S.C. 154(b) by 301 days.

(21) Appl. No.: 12/262,676

(22) Filed: Oct. 31, 2008

(65) Prior Publication Data
US 2010/0109272 A1    May 6, 2010

(51) Int. Cl.
*B62B 7/06* (2006.01)
(52) U.S. Cl. .................... 280/650; 280/642; 280/47.38; 297/344.12
(58) Field of Classification Search .................. 280/638, 280/642, 647, 650, 657, 658, 47.34, 47.38, 280/47.41; 297/340, 344.1, 344.12, 344.18
See application file for complete search history.

(56) References Cited

U.S. PATENT DOCUMENTS

| | | | |
|---|---|---|---|
| 5,301,970 A | 4/1994 | Haskins | |
| 5,520,433 A * | 5/1996 | Tokutake et al. | 297/131 |
| 5,601,302 A | 2/1997 | Beard et al. | |
| 5,709,400 A | 1/1998 | Bonnier et al. | |
| 5,845,924 A | 12/1998 | Huang | |
| 6,099,022 A | 8/2000 | Pring | |
| 6,193,263 B1 | 2/2001 | Lin | |
| 6,203,054 B1 | 3/2001 | Matsumoto | |
| 6,209,892 B1 | 4/2001 | Schaaf et al. | |
| 6,398,233 B1 | 6/2002 | Liang et al. | |
| 6,446,990 B1 | 9/2002 | Nania et al. | |
| 6,540,250 B1 | 4/2003 | Peterson | |
| 6,715,783 B1 | 4/2004 | Hanson et al. | |
| 7,377,537 B2 * | 5/2008 | Li | 280/650 |
| 7,475,900 B2 * | 1/2009 | Cheng | 280/642 |
| 7,753,398 B2 * | 7/2010 | Yang | 280/642 |
| 2006/0001226 A1 | 1/2006 | Refsum | |
| 2007/0045975 A1 | 3/2007 | Yang | |
| 2008/0296872 A1 | 12/2008 | Saville et al. | |
| 2009/0033066 A1 | 2/2009 | Saville et al. | |

FOREIGN PATENT DOCUMENTS

| | | |
|---|---|---|
| DE | 202006012430 | 11/2006 |
| EP | 1 992 543 | 8/2006 |
| FR | 2 648 102 | 12/1990 |
| WO | WO 96/22907 | 8/1996 |
| WO | WO 01/32493 | 5/2001 |

OTHER PUBLICATIONS

Great Britain Search Report issued in corresponding Great Britain Application No. 0911254.1 mailed Dec. 16, 2009.
Britax Preview Lightweight Umbrella Travel System (Jun. 2004).
Stokke Product Guide featuring Stokke Xplory stroller, 7 pages (Fall 2006).

(Continued)

*Primary Examiner* — John Walters
(74) *Attorney, Agent, or Firm* — Lempia Summerfield Katz LLC

(57) ABSTRACT

A stroller includes a frame assembly, a seat supported by the frame assembly, and first and second adjustable seat supports engaged with the frame assembly to support the seat in a position relative to the frame assembly. A link couples the first and second seat supports such that a movement of the first seat support is mirrored in a corresponding movement of the second seat support to adjust the position of the seat.

18 Claims, 11 Drawing Sheets

OTHER PUBLICATIONS

User Guide, Stokke Xplory, www.stokkeusa.com, 29 pages (Apr. 2008).
I'coo Targo Baby Stroller, www.strollermama.com, pp. 1-3 (Jun. 2008).
Instruction Manual, Peg Perego Skate, en.pegperego.com, 30 pages (Jan. 2008).
Great Britain Search Report issued in corresponding Great Britain Application No. 0911254.1 mailed Oct. 13, 2009.

* cited by examiner

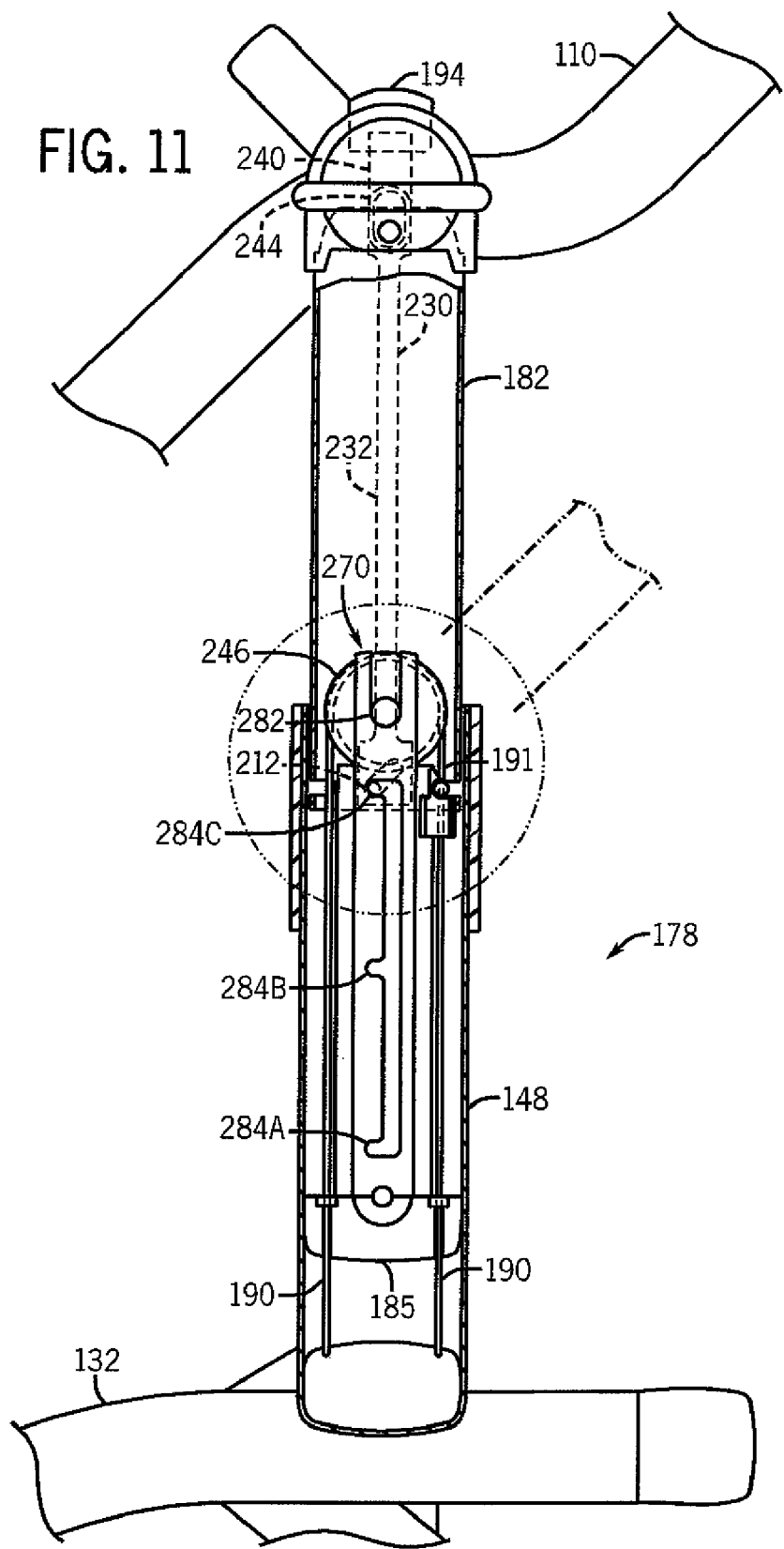

US 8,029,014 B2

STROLLER WITH SYNCHRONIZED SEAT HEIGHT ADJUSTMENT

BACKGROUND OF THE DISCLOSURE

1. Field of the Disclosure

The present disclosure is generally directed to strollers, and more particularly to strollers having adjustable seating.

2. Description of Related Art

Strollers are usually capable of re-configuration and other adjustments after assembly. Most strollers can adapt from an in-use configuration to a folded configuration for purposes of storage, transport, etc. Folding arrangements and other adjustments have often involved adjustable connectors, brackets and other links between frame sections. Using the adjustable links, re-configuration of the stroller can be accomplished without disassembling the stroller. Other adjustments have involved reclining seat backs, removable or replaceable occupant trays, and adjustable foot rests.

Some strollers have also been capable of accommodating infant child occupants. To this end, a seat assembly has been adjustable to receive an infant car seat carrier. For example, strollers have been equipped with a seat frame capable of repositioning a seat back to allow an infant car seat carrier to engage the seat frame. In these cases, the seat frame is often shaped to resemble an infant car seat base, to which the infant car seat carrier is coupled.

Unfortunately, the above-described adjustments have provided only limited amounts of stroller versatility. For example, a seat assembly may be well suited for children of a certain size, while not as well-suited for children of other sizes. Seat assemblies are also often adequately positioned for only certain uses of the stroller.

One stroller marketed as a widely compatible design is the Xplory stroller available from Stokke L.L.C. (Kennesaw, Ga.; www.stokkeusa.com). The Xplory stroller has a seat assembly that connects to a central, inclined column. The connection can be re-positioned to raise or lower the seat assembly along the central, inclined column. Further details on this stroller design are set forth in U.S. Patent Publication No. 2006/0001226.

Unfortunately, seat position changes can lead to complications as well. In some cases, the added functionality poses the risk of the child occupant initiating the seat position change. If the change occurs at an undesirable time, the safety of the child occupant could be compromised. Even if operational safeguards are in place, the relative movement of structural parts of the stroller can lead to mechanical failures or other complications.

BRIEF DESCRIPTION OF THE DRAWINGS

Objects, features, and advantages of the present invention will become apparent upon reading the following description in conjunction with the drawing figures, in which:

FIG. 11 is a partial, sectional view of the adjustable seat support similar to the view depicted in FIG. 10 but after use of the link assembly and the lock-and-release mechanism to reach a raised height level.

DETAILED DESCRIPTION OF THE DISCLOSURE

Figure 1:
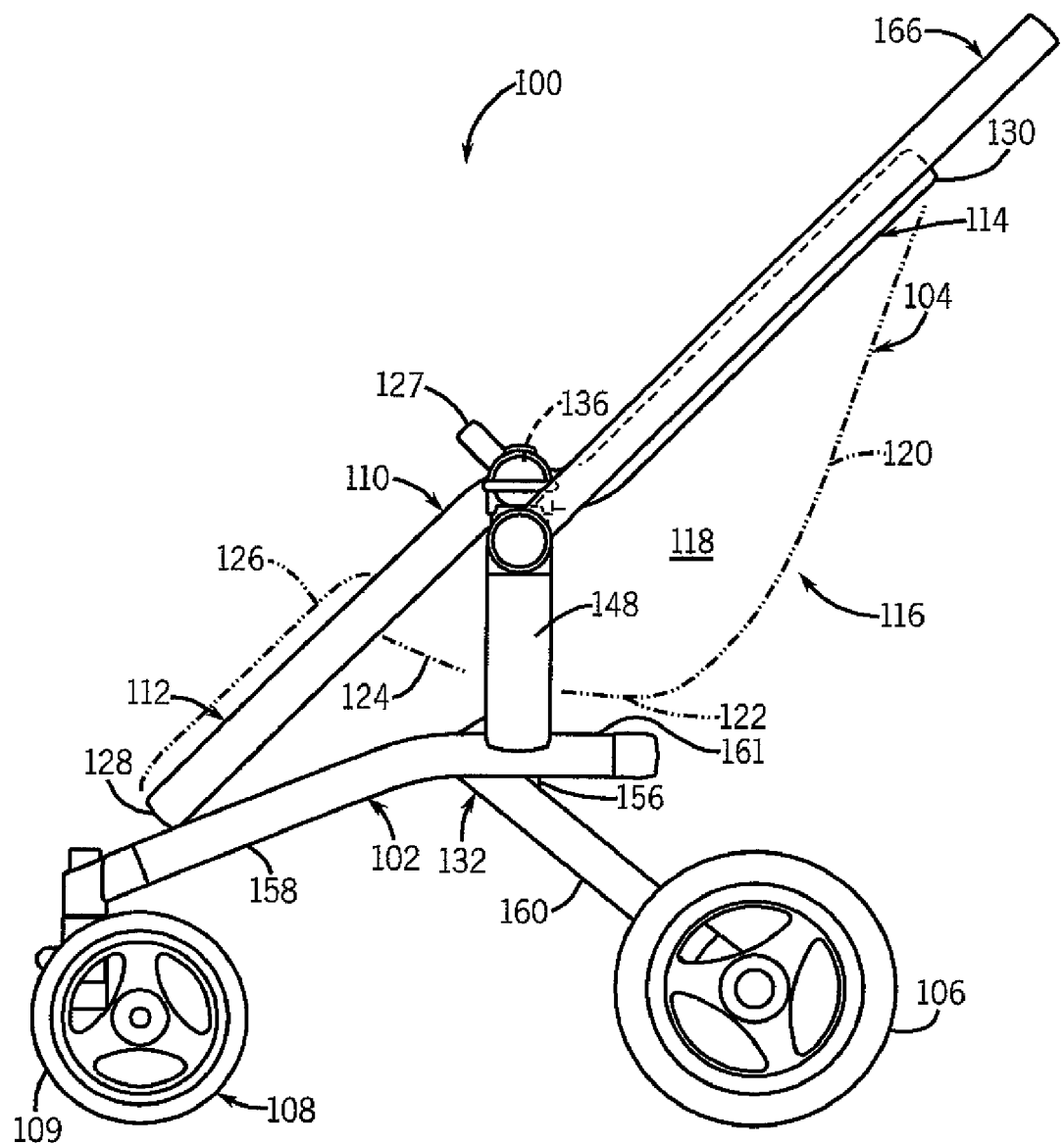
FIG. 1 is a side, elevational view of an exemplary stroller having adjustable seat supports constructed in accordance with one or more aspects of the disclosure.

The disclosure is generally directed to a stroller constructed to provide synchronized or mirrored movement to change seat position, such as the height of the seat. Adjustments to seat height are often useful and convenient for both the child occupant and the caregiver, as described in co-pending and commonly assigned U.S. application Ser. No. 11/756,702, filed Jun. 1, 2007, and entitled "Stroller with Seat Height Adjustment," the entire disclosure of which is hereby incorporated by reference. Changing the seat height to a high level can provide a convenient seating position for eating at a table in a restaurant or other setting that would otherwise call for a high chair. At other times, a lower seat height can allow the child to be near toys or other children at play. A variety of other (e.g., intermediate) height levels can be provided to suit the height of the caregiver.

The disclosure provides a number of exemplary designs that facilitate such seat height adjustments through synchronizing the movement of seat supports. The synchronization generally facilitates the height adjustments while maintaining a secure and stable seating arrangement for the child occupant. The synchronization also generally helps avoid structural or mechanical complications arising from the movement of the seat supports or other components of the stroller during changes in seat position.

One or more aspects of the disclosure are directed to addressing the challenges arising from having multiple seat supports, including those challenges presented by multiple releases or actuators (e.g., a dual release) to initiate a seat height adjustment. On the one hand, more than one release mechanism may be advantageous in, for example, deterring or preventing an accidental or otherwise undesired change in seat height. For example, it may be impracticable or impossible for a child occupant to engage two independent release mechanisms at the same time. On the other hand, the independence of the two releases can, in some cases, allow for independent movement of the seat supports. The stroller designs described herein avoid the separate or independent movement complication of the multiple release arrangement. As a result, the seats of the disclosed strollers avoid becoming improperly mounted, such as when one seat support is displaced relative to its counterpart. More specifically, the disclosed designs prevent one side of a seat from being positioned at a different height than the other side, which would tilt the stroller seat sideways and potentially jam the seat in place. Avoiding these complications, the disclosed strollers can realize the safety and other advantages of having multiple release mechanisms to change seat height.

The disclosed strollers address other challenges and safety risks that can arise in multiple seat support designs, even those that arise when the seat supports are released concurrently as intended. For instance, the disclosed strollers are generally designed to prevent the sides of the seat assembly from lowering at different rates due to an uneven load or other conditions. As a result, the disclosed designs prevent tilting and instability in the seat that can arise when the seat supports can move during an attempted seat height adjustment. In some cases, the disclosed strollers can also be constructed to prevent the abrupt drops in seat level that could otherwise result during a height adjustment while the seat is occupied.

These and other challenges are generally addressed by a link that couples adjustable seat supports. The link can synchronize the movement of the seat supports, prevent relative displacement, and assist or otherwise control the height adjustment. For instance, movement of one seat support may be mirrored via the link in corresponding movement of another seat support. In addition to mirroring the movement, the link may limit the speed at which the height level can be changed, preventing undesirably rapid drops in seat level. Conversely, the link may facilitate upward movement so that a caregiver can more easily adjust the height level with the child occupying the seat. These and other aspects of the disclosed designs may also facilitate changing the seat height when the caregiver can apply substantial force to only one side of the seat.

In some cases, the link includes a cable coupling a pair of risers. Each riser, in turn, may include a post telescopically received within a frame post. In these and other cases, the seat height adjustment involves a slidable interface or coupling at the interface(s) between a frame assembly and a seat assembly. In some cases, the slidable interface is supported by a stationary guide inserted into a frame post. The guide insert may then include locking mechanisms to maintain a desired seat height level.

The disclosed designs need not have multiple release mechanisms, the above-described advantages notwithstanding. Indeed, some aspects of the disclosure are directed to maintaining a safe and secure seat height level with one or more lock-and-release mechanisms. More generally, the lock-and-release mechanisms described herein are released to permit the seat height adjustment without disengaging or decoupling the link. That is, the link continues to couple the seat supports and engage the stroller frame during the height adjustments. In this way, the caregiver can change the seat height in a controlled and safe manner. The continuous nature of the link may also be utilized in power-assist and resistance features, as described further below. For these and other reasons, the disclosed designs can still prevent a child occupant from easily adjusting the stroller seat height, thereby providing a secure and stable seating arrangement for the child. One further, unexpected advantage of these aspects of the disclosed designs is that a button or other actuator of the lock-and-release mechanism may be conveniently located for the caregiver (e.g., convenient accessibility on top of a support post on each side of the seat) as opposed to positions more remote from the child occupant.

Further aspects and unexpected advantages of the disclosed designs involve examples having more than one lock-and-release mechanism. Generally speaking, neither seat support can be lowered if only one of the locks is released because the link between the seat supports prevents any movement without both locks released. In some cases, tension within a cable of the link prevents support posts from moving relative to the stroller frame. Moreover, the tension increases when the seat is under load (e.g., a child is seated in the stroller). Because the support post with the released lock is not allowed to move, the lock (and more generally the post) can return to a locked position after the releasing force is no longer applied. This aspect of the designs reduces the potential safety issues arising from a child sequentially releasing the locks.

Turning now to the drawings, an exemplary stroller is generally depicted at 100 in FIGS. 1-4 and is constructed in accordance with the teachings of the present disclosure. In this example, the stroller 100 generally has a frame assembly 102, a seat assembly 104 (FIG. 1) supported by the frame assembly 102, and a plurality of wheels supporting the frame assembly 102 on a ground surface. The frame assembly 102 in the disclosed example includes a pair of rear wheels 106 and a pair of front wheel assemblies indicated generally at 108. In this example, each front wheel assembly 108 has two wheels 109 spaced apart side by side. The configuration and construction of the front wheel assemblies 108 and the rear wheels 106 can vary considerably and yet fall within the spirit and scope of the present invention.

The frame assembly 102 generally has a seat mounting frame 110 configured for compatibility with a variety of seat assemblies or other seating components. To that end, some, if not all, of the seat assembly 104 may be removable from the seat frame 110 and the stroller 100. For example, a car seat carrier (not shown) may then engage the seat frame 110 to accommodate an infant child occupant. In these and other cases, the seat mounting frame 110 may be considered an integral or other component of the frame assembly 102. However, the seat mounting frame 110 may also be considered a part or portion of the seat assembly 104, such as when one or more other units of the seat assembly 104 are integrally formed with the seat mounting frame 110 or otherwise not removable from the seat mounting frame 110. More generally, the seat mounting frame 110 may alternatively be considered a component shared by both the frame assembly 102 and the seat assembly 104.

In this exemplary case, one or more components of the seat assembly 104 are supported by a pair of U-shaped components of the seat frame 110. More specifically, the U-shaped components correspond with a lower, front seat attachment tube 112 and an upper, rear seat attachment tube 114. Both of the seat attachment tubes 112, 114 have elongated sides integrally formed with arch-shaped ends, collectively defining upper and lower U-shaped support structures. Each seat attachment tube 112, 114, in turn, defines a respective area in which portions of the seat assembly 104 are positioned or suspended. For example, as best shown in FIG. 1, a seat indicated generally at 116 and shown in phantom may include side panels or wings 118 and a seat back or backrest 120 suspended from the seat attachment tube 114. The side panels 118 and the backrest 120 may extend downward toward, and connect with, a seat bottom 122 of the seat 116. The seat bottom 122 may also be suspended from, or supported by, the seat attachment tube 112 at a front end 124 of the seat bottom 122. The seat assembly 104 may also include a leg rest portion 126 disposed within the arch defined by the seat attachment tube 112. An occupant tray bar 127 may cross the seat assembly 104 at a position above the leg rest portion 126 and forward of the backrest 120. Apart from supporting an occupant tray (not shown), the bar 127 may help retain the seat occupant in the seat 116 and be used for other purposes (e.g., an occupant arm rest or an infant carrier attachment). Optional components of the seat assembly 104 include a foot rest (not shown) connected to the seat mounting frame 110 at or near a lower end 128 of the seat attachment tube 112, as well as a canopy (not shown) connected to the seat mounting frame 110 at or near an upper end 130 of the seat attachment tube 114.

Any one or more of the above-referenced parts of the seat 116 can be made entirely of fabric or like materials and include components directed to facilitating attachment to, or suspension from, the seat frame 110. Alternatively or additionally, portions of the seat assembly 116 may include a cover material, which may be removable, and placed over a generally rigid supporting structure that defines and shapes the portion of the seat, such as the seat bottom 122 or the seat side wings 118. Thus, once attached to the seat frame 110, the seat assembly 104 can be sufficiently supported on the stroller 100 and substantial enough to support the weight of a child occupant. More generally, the configuration and construction of the seat 116 and other portions of the seat assembly 104 can vary considerably as desired.

The lower and upper seat attachment tubes 112 and 114 are coupled to a base portion or chassis 132 of the frame assembly 102 at a pair of rotational or pivotal seat joints 134 and 136. More specifically, side rails or arms 138 and 140 (FIG. 2) of the lower seat attachment tube 112 extend rearward and upward from the lower end 128 to terminate at the seat joints 134 and 136, respectively. Similarly, side rails or arms 142 and 144 (FIG. 2) of the upper seat attachment tube 114 extend downward and forward from the upper end 130 to terminate at the seat joints 134 and 136, respectively. In this exemplary case, the lower and upper seat attachment tubes 112 and 114 are separately coupled to the seat joints 134 and 136 to enable independent rotation of the lower and upper seat attachment tubes 112 and 114. In other cases, the lower and upper seat attachment tubes 112 and 114 may be integrally formed or otherwise fixedly attached to one another. The seat joints 134 and 136 are positioned on horizontal pivot axes M1 and M2 (FIG. 2) that extend horizontally along a transverse line disposed between the front and rear wheels 106, 109. The seat joints 134 and 136 generally allow the inclination or declination of the components of the seat assembly 104 to be adjusted relative to the base frame or chassis 132, which, in contrast, generally includes a set of structural components in fixed relation to each other during use in operational configurations. Each end of the occupant tray bar 127 may also be coupled to the frame assembly 102 at or near the seat joints 134, 136.

In the exemplary embodiment shown in FIGS. 1-4, the chassis 132 and, more generally, the frame assembly 102 includes a pair of upstanding frame posts 146 and 148 that extend upward to the seat joints 134 and 136, respectively. In this manner, the frame posts 146 and 148 couple the seat frame 10 (and, by extension, the seat assembly 104) to the remainder of the frame assembly 102 (and, by extension, the non-seating portions of the stroller 100) at a position, or level, above the chassis 132. Each post 146, 148 may have a tubular cross-section and, for example, be formed from extruded aluminum or any other material(s) providing sufficient structural support. The posts 146 and 148 are connected by a cross member or brace 150 (FIGS. 2-4) of the chassis 132 that may, but need not, be integrally formed with the posts 146, 148, as shown. The brace 150 extends horizontally on a line parallel with the pivot axes M1 and M2 and may include ends 152 and 154 that are bent upward to meet the posts 146, 148. In this exemplary case, the brace 150 and the posts 146, 148 form a U-shaped support structure extending upward from other portions of the base frame or chassis 132 to interface with the seat frame 110 and other seating components of the stroller 100.

The frame assembly 102 further includes a bracket 156 to couple the brace 150 to a pair of front legs 158 and a pair of rear legs 160 of the chassis 132. In alternative embodiments, a clamp or other connector may be utilized to couple the brace 150 to the front and rear legs 158 and 160. The brace 150 need not be coupled to both the front and rear legs 158 and 160 via the same connection. In some cases, one or more additional brackets, clamps or other connectors (not shown) may be included to establish any number of further frame leg connections. Further details regarding the manner in which the legs 158 and 160 are coupled to the remainder of the frame assembly 102 are provided below in connection with a number of exemplary embodiments.

In this exemplary case, the front legs 158 are disposed on an incline until about midpoint between the front and rear wheels 106, 109, at which point each front leg 158 is bent to a horizontal, cantilevered end 161 of the chassis 132. Each cantilevered end 161 extends rearward from the front legs 158 beyond the bracket 156 before being capped at termination points generally above the rear legs 160, as shown in FIG. 1. Alternatively, the front legs 158 are connected at the ends 161 by a U-shaped link or brace.

Figure 2:
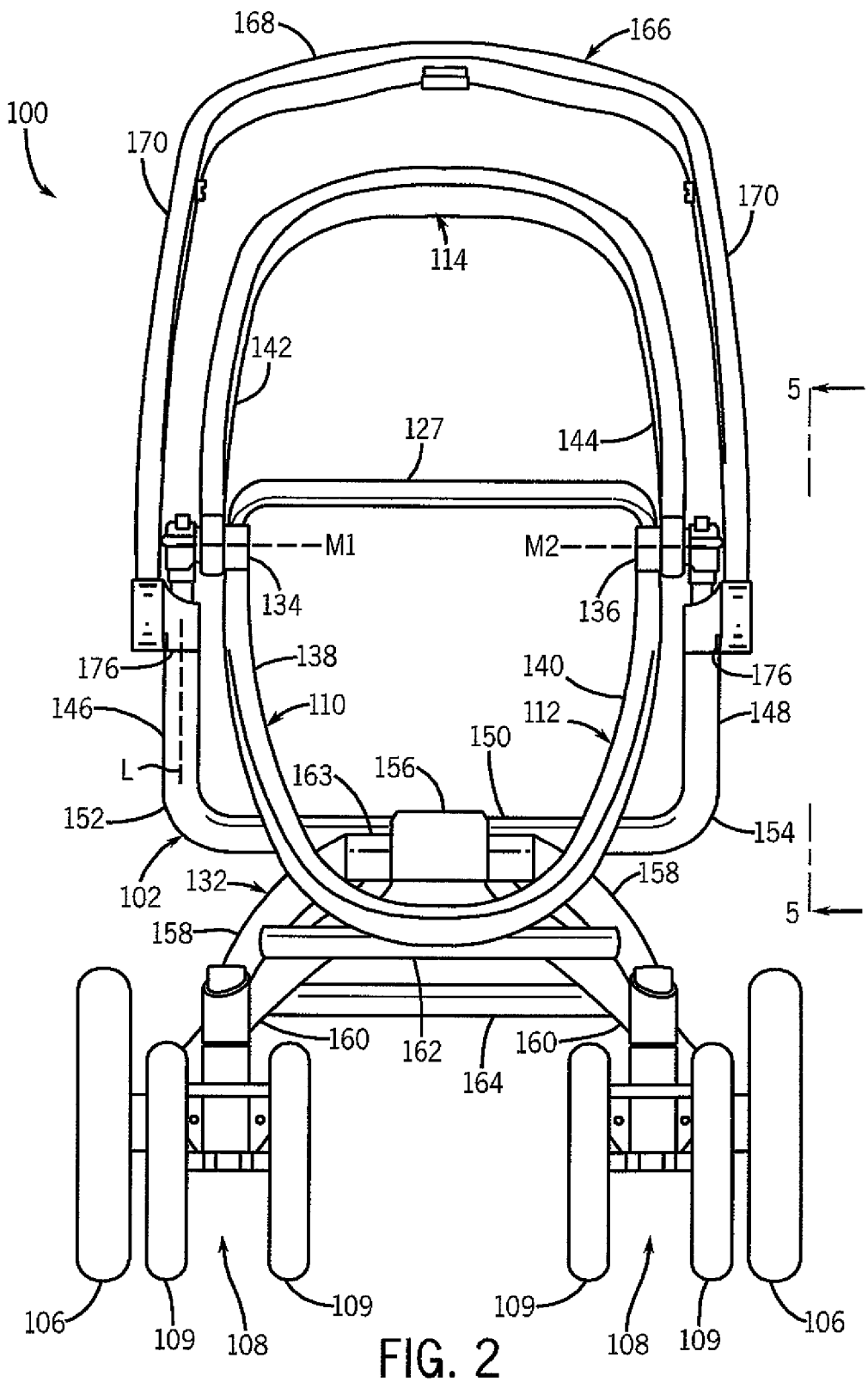
FIG. 2 is a front, elevational view of the stroller of FIG. 1.
Figure 3:
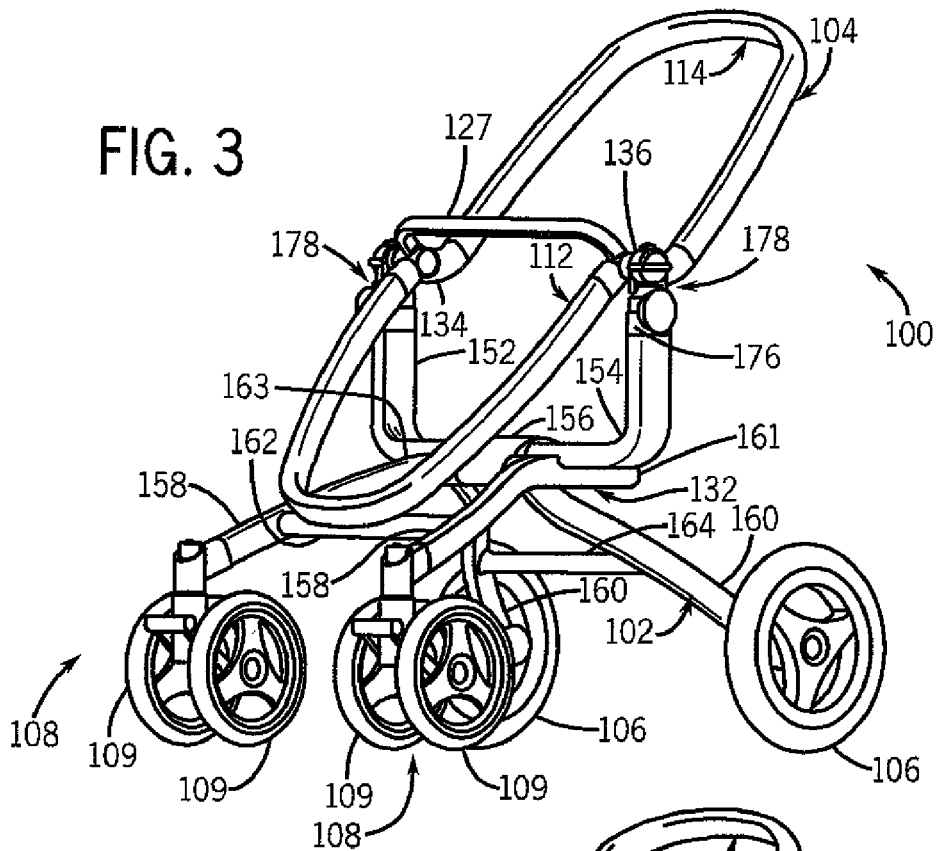
FIG. 3 is a front, perspective, and simplified view of the stroller of FIG. 1 showing the adjustable seat supports positioning a seat at a lowered height level.
Figure 4:
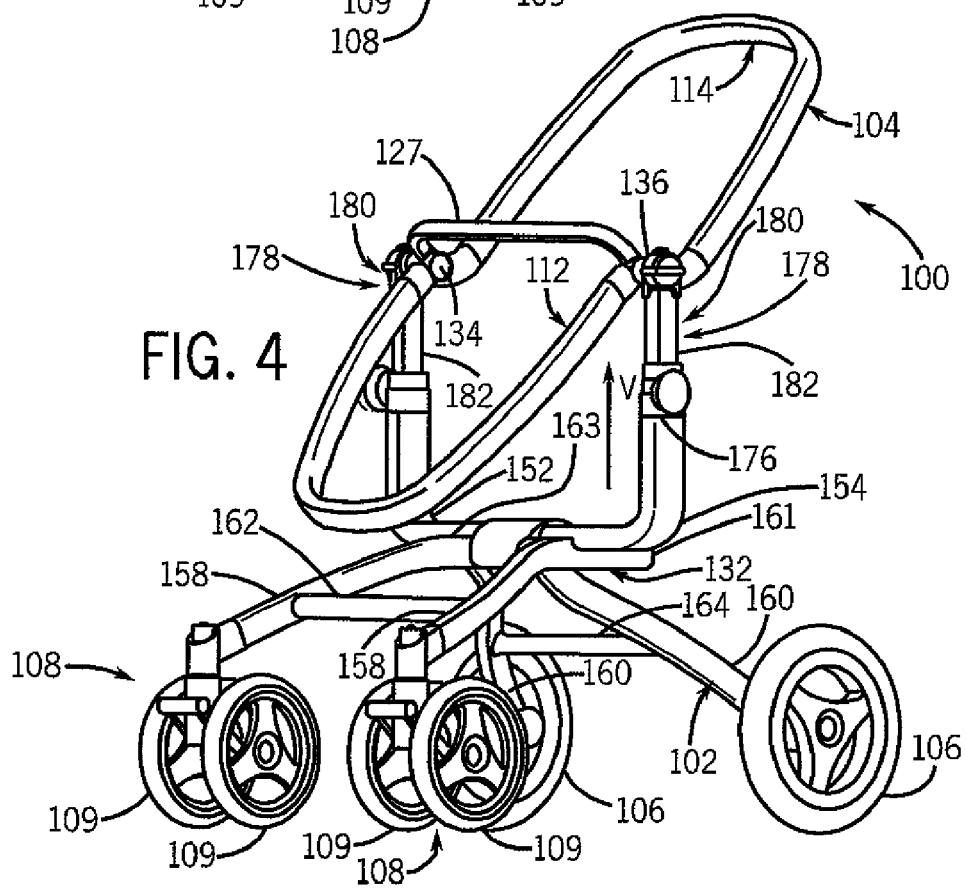
FIG. 4 is a front, perspective, and simplified view of the stroller of FIG. 1 showing the adjustable seat supports positioning the seat at a raised height level.

The pair of front legs 158 are laterally connected by transverse front leg links 162 and 163 (FIGS. 2-4), while the pair of rear legs 160 are laterally connected by a transverse rear leg link 164 (FIGS. 2-4). The links 162-164 generally provide stability for the frame assembly 102. To this end, the leg links 162 and 164 extend horizontally between the legs connected thereby at a position approximately midway down the length of the corresponding legs. The front leg link 163 also extends horizontally between the front legs 158 at an upper end thereof. The bracket 156 engages the leg link 163 midway between the front legs 158, as best shown in FIG. 2. Each leg link 162, 163, 164 may be integrally formed with the legs connected thereby or otherwise attached in a secure manner to provide structural support. Other embodiments may alternatively or additionally include leg links disposed at different positions along the length of the legs 158, 160. In the exemplary embodiment shown, the front legs 158 are not linked to the rear legs 160 other than at the bracket 156. Alternatively, one or more leg links may also be provided to connect one of the legs 158 with one of the legs 160, in which case the connection may be adjusted to accommodate inward retraction toward one or more folded configurations. For example, a longitudinal link between a front leg 158 and a rear leg 160 may be sectioned with joints to facilitate folding. In these and other ways, the chassis 132 and, more generally, the frame assembly 102, may include any number and variety of leg links and other connectors in any desired configuration to provide a stable base or foundation for the seat assembly 104.

As shown in FIGS. 1 and 2, the stroller 100 includes an adjustable handle 166 that extends from the frame assembly 102 via a pair of handle connectors 176 and a pair of handle pivot hubs 177. As best shown in FIGS. 2-4, each handle connector 176 may include a bracket, ring, clamp, or other connector to secure one of the handle pivot hubs 177 and, thus, the handle 166, to the frame posts 146, 148 at a desired position. In this case, the handle connectors 176 are fixedly secured at a location at or near top ends of the frame posts 146, 148. In some cases, the location of the handle connectors 176 is adjustable upward from the seated position shown. For example, the handle connector 176 may form a pressure fit around the frame posts 146, 148 that can be released to move the handle connector 176 to a new position along the frame posts 146, 148. Further details regarding examples of the adjustable handle 166 are set forth in co-pending, commonly assigned U.S. application Ser. No. 11/831,430, entitled "Stroller with Foldable Frame and Adjustable Handle," and filed Jul. 31, 2007, the entire disclosure of which is hereby incorporated by reference.

With reference now to FIGS. 3 and 4, the height level of the seat assembly 104 is generally adjustable relative to the ground level, or equivalently, the chassis 132 or the frame assembly 102. In this case, the height level adjustment is accomplished via directly upward or downward movement, such as along a vertical direction V (FIG. 4). As a result, the upward and downward movement generally does not alter the fore-and-aft (or longitudinal) position of the seat assembly 104 relative to the base frame or chassis 132. Avoiding any such alteration may be useful, for instance, in connection with maintaining a desired weight distribution between the front and rear wheels. In that way, any height level adjustments do not result in balance or stability issues. More generally, the height adjustment occurs in a direction along an axis of the frame posts 146 and 148. Thus, in alternative cases, the adjustment of the seat position need not involve solely vertical movement, including when, for example, the longitudinal axes of the frame posts 146 and 148 are not vertically oriented.

The seat position adjustment generally involves an adaptable interface between the seat frame 110 and the chassis 132 or the frame assembly 102. In the example shown, the interface generally includes dual adjustable seat support assemblies 178 that couple the seat frame 110 to the chassis 132. Each seat support 178, in turn, is generally aligned with one of the frame posts 146, 148. This alignment results in a vertical orientation of each seat support 178 corresponding with the vertical orientation of an axis L (FIG. 2) of the frame posts 146, 148. In this example, each seat support 178 slidably engages one of the frame posts 146, 148 for movement relative to the chassis 132. Such relative movement, in turn, adjusts the seat frame 110 between multiple, in-use height levels relative to the frame assembly 102 and the chassis 132. Further details regarding the operation and components of the seat supports 178 are set forth below in connection with several examples. The seat support examples are described with the understanding that the seat supports 178 may alternatively or additionally be considered to include the frame posts 146, 148.

In the exemplary embodiment shown in FIG. 4, each seat support 178 includes a seat riser 180 that can be positioned to extend out of, e.g., upward, from one of the frame posts 146, 148. Each seat riser 180, in turn, includes a riser post 182 shaped to engage one of the frame posts 146, 148. Specifically, FIG. 4 shows the seat risers 180 after upward relative movement along a vertical direction V from the position shown in FIG. 3, revealing a portion of the riser posts 182. In this example, each riser post 182 slidably engages one of the frame posts 146, 148 in a telescopic arrangement that collectively provides support for the seat assembly 104 and the seat frame 110 relative to the base frame or chassis 132. In the example shown in FIGS. 3 and 4, each riser post 182 has a columnar shape configured to be cooperatively received by one of the frame posts 146 and 148. The cooperative shapes of the riser and frame posts may vary from the example shown, including, for instance, circular and other non-rectangular cylindrical cross-sections. As described further below, the seat supports 178 include a number of further components to synchronize the movement and secure positioning of the seat risers 180.

While the examples to follow involve the seat risers 180 and the riser posts 182 received within one of the frame posts 146 and 148, alternative telescoping arrangements may involve a reverse relationship where the frame posts 146 and 148 are inserted within, or received by, elements of a seat riser or other component of the seat frame 110. Notwithstanding the foregoing, the height level adjustment aspect of this disclosure is not limited to telescoping columns or other telescoping arrangements. On the contrary, the height level of the seat assembly 104 may involve other types of sliding arrangements, including, for instance, posts, shafts or columns arranged in side-by-side and other configurations for generally vertical movement to raise or lower the seat assembly 104. Furthermore, the relative movement of the frame components need not be linear. One example of non-linear movement may involve a threaded relationship that results in helical or twisting motion.

Figure 5:
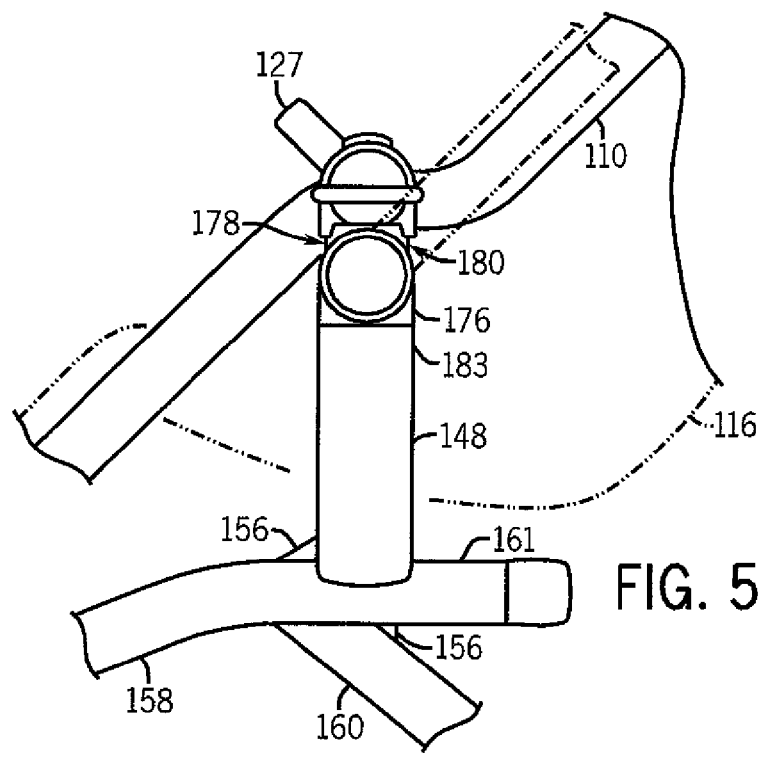
FIG. 5 is an elevational, side, and partial view of the stroller of FIG. 1 taken along lines 5-5 of FIG. 2 to depict the adjustable seat supports in greater detail.
Figure 6:
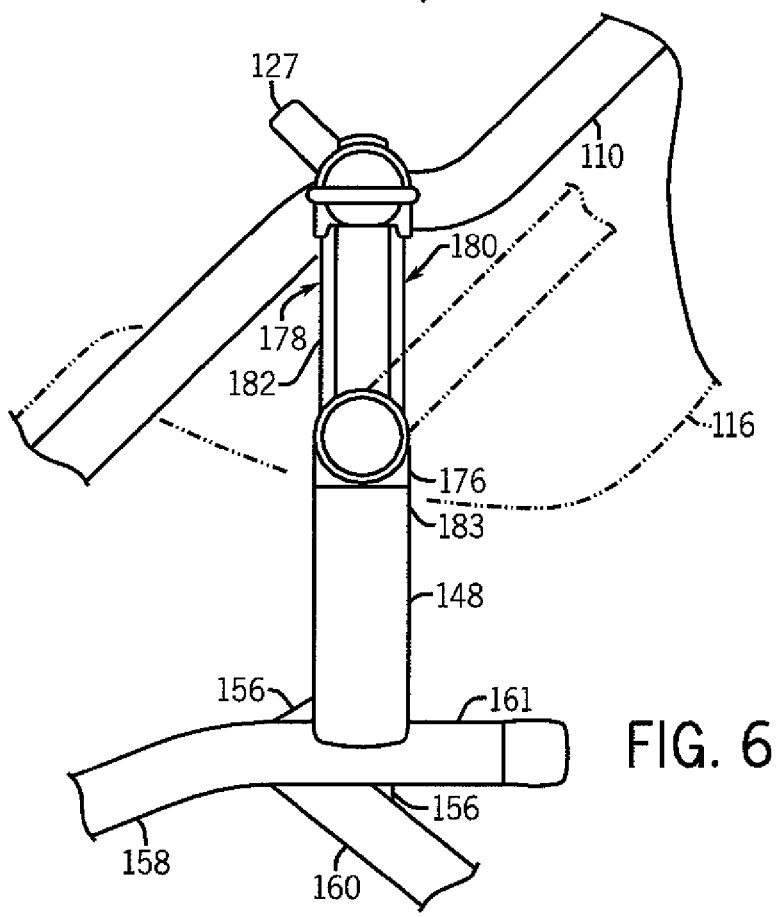
FIG. 6 is an elevational, side, and partial view of the stroller of FIG. 1 to depict the adjustable seat supports in greater detail after adjustment to a raised height level.

FIGS. 5 and 6 depict the operation of the adjustable seat supports 178 in greater detail. In this example, the seat riser 180 of the adjustable seat support 178 is disposed to a varying extent within the frame post 148. Depending on the desired seat height, the seat riser 180 extends out of, and upward from, an upper end 183 of the frame post 148, which may be shaped and otherwise configured to receive the handle connector 176. FIG. 5 shows the seat riser 180 disposed almost completely within the frame post 148 such that the seat frame 110 and, thus, the seat 116 are located at a low seat height position. In turn FIG. 6 shows the riser post 182 of the seat riser 180 extending upward from the upper end 183 of the frame post 148 such that the seat 116 is positioned at a level higher than the position shown in FIG. 5.

The operation of the adjustable seat supports 178 may provide a variety of height level options. In some cases, the seat risers 180 may cooperate with the frame posts 146, 148 to provide a discrete number (e.g., three) of height level options for the seat 116. Alternative arrangements may present an increased (or decreased) number of height level options, as desired. Other embodiments may support continuous (rather than discrete) height level adjustment for an infinite number of height level options.

Figure 7:
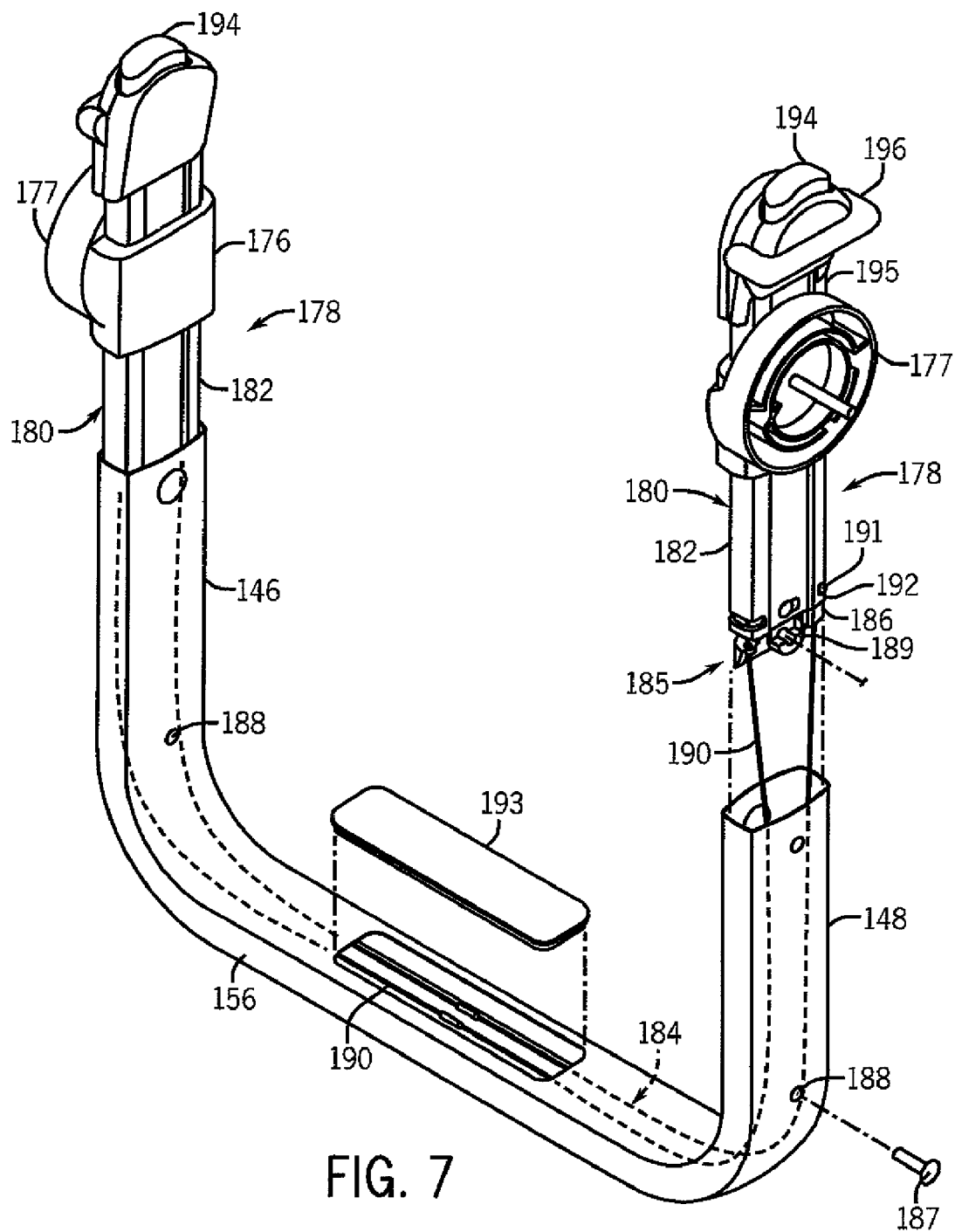
FIG. 7 is a perspective and partially exploded view of the adjustable seat supports in accordance with one example having a link assembly and a lock-and-release mechanism to effectuate and control the seat height adjustments.

The adjustable seat supports 178 of an exemplary embodiment are shown in FIGS. 7-11 in partially assembled and exploded form to depict a number of components housed within the frame posts 146, 148 during operation. With reference now to FIG. 7, one of the adjustable seat supports 178 is shown in a position partially extending from the frame post 146, while the other seat support 178 is shown completely removed from the frame post 148. In this way, FIG. 7 shows the manner in which the seat supports 178 are linked, with the understanding that the depicted positions do not correspond with an in-use arrangement. Generally speaking, the adjustable seat supports 178 are coupled via a link or link assembly 184 engaged with the base frame or chassis 132 to secure the seat supports 178 within the frame posts 146, 148. The seat supports 178 are further secured to the frame posts 146, 148 via stationary guide inserts 185 seated within the frame posts 146, 148. Each guide insert 185 may be formed from molded plastic and generally configured to slidably guide one of the riser posts 182 relative to one of the frame posts 146, 148. Each guide insert 185 is fixedly secured in an upright orientation within one of the frame posts 146, 148, as well as attached thereto. As a result, each riser post 182 is capable of sliding movement relative to both the guide insert 185 and one of the frame posts 146, 148. The guide inserts 185 may be considered part of the seat risers 180, as the guide inserts 185 are located at a base or lower end 186 of each seat riser 180 with the riser posts 182 slidably engaged therewith, and rising upward therefrom. Alternatively or additionally, the guide inserts 185 may be considered part of a lock-and-release mechanism (as described below) or the link assembly 184, as the guide inserts 185 form part of an interface coupling components of the link assembly 184 with the riser posts 182. Rivets or other fasteners 187 are used to secure the guide inserts 185 and, thus, the seat risers 180 to the frame posts 146, 148. To that end, each rivet 187 is threaded through or otherwise received in an aperture 188 formed in the frame posts 146, 148, and an aperture 189 in the guide insert 185. Further details regarding the guide inserts 185 are set forth below.

The link assembly 184 in this example includes a link or synchronization cable 190 arranged in a loop between the seat supports 178. As described below, the link cable 190 generally links or synchronizes the movement of the seat supports 178. Generally speaking, when one side of the seat support assembly is raised or lowered, tension in the link cable 190 causes the other side to follow. Movement of one seat support is thus mirrored in the other seat support, including both displacement and rate of displacement. This synchronization generally prevents the seat frame 110 from wracking or jamming due to one side being higher than the other. To these ends, the link cable 190 is attached to each riser post 182, and remains so attached during the movement (e.g., when the seat supports 178 are released for a seat height adjustment), as described below. The link cable 190 thus couples the riser posts 182 in a continuous manner. In this example, starting on the side with the frame post 148, the link cable 190 is fixed along its length at a position 191 to one of the seat risers 180 at a lower end 192 of the riser post 182. The link cable 190 then loops through the seat support 178, redirecting downward to pass through the frame post 148. The link cable 190 then runs through the brace portion 156 of the U-shaped support structure of the base frame or chassis 132 to reach and pass through the other frame post 146. On that side of the chassis 132, the link cable 190 is fixed to the other seat riser 180 at the lower end 192 of the corresponding riser post 182, and is redirected within the seat support 178 to return to the starting point through the same path, thereby forming the loop. A panel 193 of the chassis 132 may provide access to the link cable 190 within the brace 156 during assembly and installation. The loop may be formed by attaching ends of the cable 190 together with one or more crimp connectors as shown, or in any other desired manner. Further details regarding the configuration and operation of the link cable 190 and the link assembly 184 are provided below.

In this example, each adjustable seat support 178 also includes a lock-and-release mechanism to secure the seat risers 180 in place at a desired seat height, as well as allow the movement of the riser posts 182 to adjust the seat height. As shown in FIG. 7, a button actuator 194 of the lock-and-release mechanism is positioned at an upper end 195 of the seat risers 180. The upper end 195 is covered by a cap 196 from which the button actuator 194 extends upward. Each button actuator 194 is coupled to other components of the seat support 178 that are configured to allow the link cable 190 and the riser post 182 to move relative to the frame posts 146, 148 once the button actuator 194 is displaced downward by a caregiver.

Figure 8:
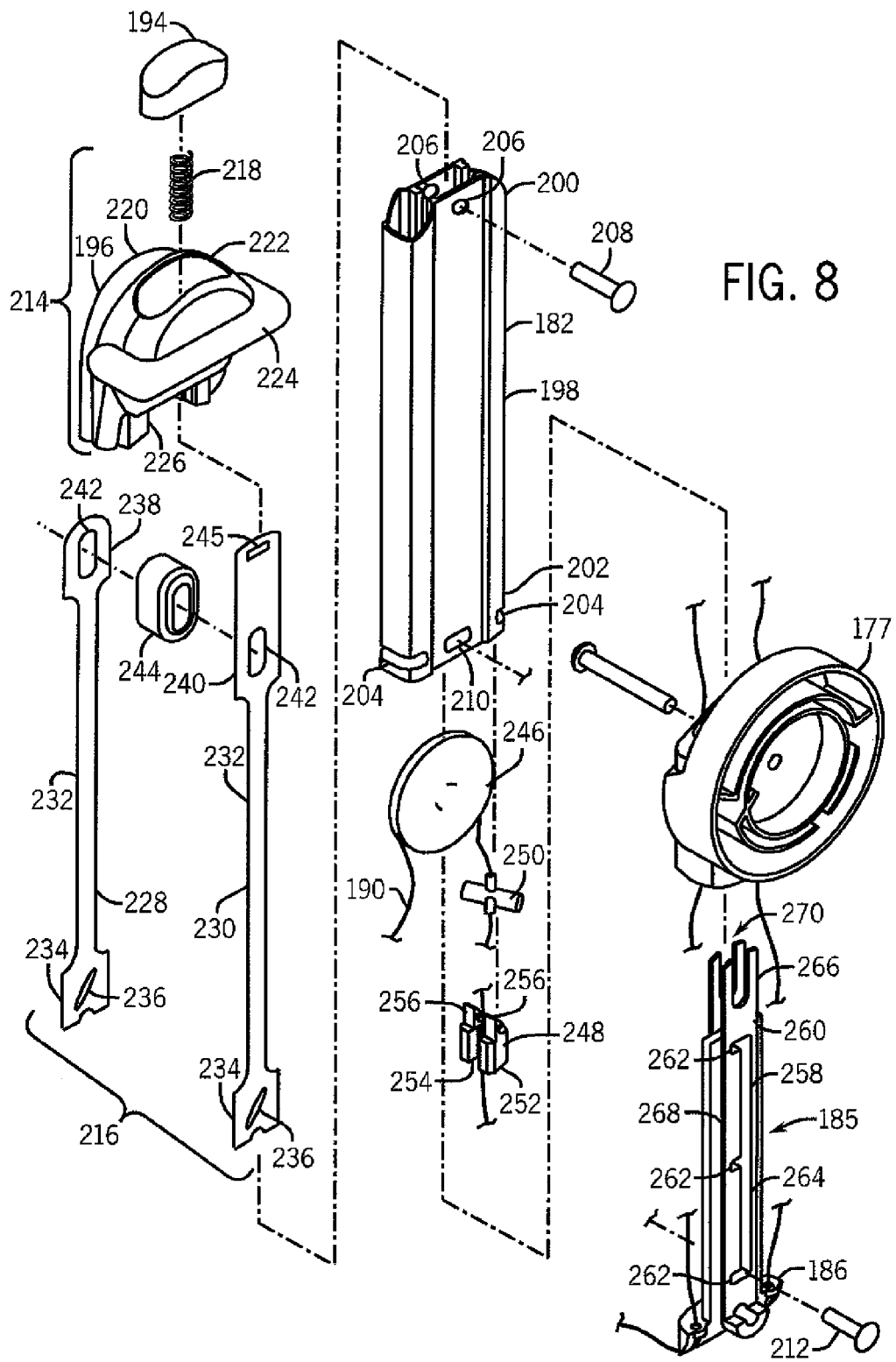
FIG. 8 is an exploded view of one of the adjustable seat supports of FIG. 7 to depict the link assembly and the lock-and-release mechanism in greater detail.

FIG. 8 illustrates the lock-and-release mechanism together with components of the link assembly 184 and the seat riser 180. In this example, the riser post 182 includes a generally rectangular cylindrical tube 198. An upper end 200 of the tube 198 is tapered and otherwise shaped to cooperate with the cap 196, while a lower end 202 has a matching pair of laterally oriented slots 204 on opposite sides of the tube 198 for engaging the link assembly 184. Each slot 204 is generally shaped as a receptacle for a pin-based cable fastener, as described further below. The upper end 200 has a matching pair of openings 206 to receive a rivet or other fastener 208 that passes through the tube 198 for attaching components of the seat riser 180, such as the tube 198 and actuator parts of the lock-and-release mechanism. The lower end 202 has a matching pair of openings 210 on facing sides of the tube 198 to receive a pin, bolt, or other bar-shaped object 212 that passes through the tube 198 and, more generally, the seat riser 180, to maintain the position of the riser post 182 and, thus, the seat height level. The operation and use of the bolt 212 and the openings 210 in the seat height adjustment are described in greater detail below.

In addition to an actuator (e.g., the button actuator 194), the lock-and-release mechanism generally includes a set of components that translates the force applied to the actuator to unlock or release the adjustable seat support 178 for movement. To this end, the lock-and-release mechanism of the example shown in FIG. 8 includes an actuator mount 214 and an actuator (e.g., button) extension or connector 216. In this example, the actuator mount 214 includes the cap 196 and a bias spring 218 disposed between the cap 196 and the button actuator 194. The cap 196 may include a housing 220 with an opening 222 for receiving the button actuator 194 and a gripping rail 224 that extends laterally to provide a surface for a user to hold while depressing the button actuator 194. An underside of the housing 220 has a receptacle 226 sized and shaped to engage the upper end 200 of the tube 198, thereby securing the tube 198 to the actuator mount 214.

The button extension 216 generally couples the actuation and locking components of the lock-and-release mechanism, while translating the vertical motion of the button actuator 194 into a lateral displacement of the bolt 212. In this example, the button extension 216 includes vertically elongated parallel connector strips 228 and 230. Each connector strip 228, 230 has a vertically elongated and narrowed central segment 232 and a translating coupler 234 from which the central segments 232 extend upward. Each translating coupler 234 is widened to accommodate an angled slot 236 shaped to receive the bolt 212. The angled orientation of the slots 236 translates the vertical motion of the strips 228, 230 into lateral motion of the bolt 212. Upper ends 238, 240 of the strips 228, 230 are also widened relative to the central segments 232 to accommodate apertures 242 configured to receive a spacer 244. The upper end 240 of the connector strip 230 extends farther upward than the upper end 238 of the strip 228 so that an engagement slot 245 is positioned to engage and cooperate with the button actuator 194 or other fixture of the actuator mount 214 driven thereby. Once assembled, the connector strips 228 and 230 are movably engaged with the cap 196, projecting downward from the cap 196 a distance generally corresponding with the length of the tube 182. In this regard, the strips 228 and 230 act as actuator legs to couple the button actuator 194 with the remainder of the lock-and-release mechanism. The connector strips 228 and 230 are coupled together by the spacer 244 such that a separation is maintained to allow the button extension 216 to extend along opposite sides of the guide insert 185, as described further below.

The configuration and components of the actuator mount 214 and the button extension 216, as well as the lock-and-release mechanism more generally, may vary considerably from the example shown. For instance, the lock-and-release mechanism may include additional or different actuators, which need not be mounted in the cap 196. Indeed, the actuator mount may include any number of actuators, which may be placed in various locations across the seat frame 110 or along the chassis 132. For instance, an actuator may be disposed at a lower or more rearward position than the cap location shown. In some cases, one or more actuators may be disposed on side or bottom faces or portions of the frame posts. Furthermore, the button extension 216 may utilize a different number of connectors (e.g., one or more), which need not be strip-shaped. For example, the central segment 232 may be rod-shaped, and the ends may have a thickness and shape other than that of a thin plate or strip. Still further, some designs may include other extension connector arrangements. In some cases, other symmetrical arrangements of multiple extension connectors (e.g., an even number of matching strips) can apply force on the bolt 212 in a balanced manner, as in the example shown. In that way, the bolt 212 is pushed on both ends or sides, thereby reducing the likelihood of jamming, turning, or moving in an unintended direction. However, asymmetrical arrangements or unitary elements, such as a single pushrod, may also be used.

With continued reference to FIG. 8, several components of the link assembly 184 generally engage the tube 198 of the seat riser 180 to support and control the movement of the tube 198. Generally speaking, these components of the link assembly 184 secure the link cable 190 (or other link) to the seat riser 180 and help to maintain the tensioned loop that synchronizes and regulates the seat height adjustments. In this case, the synchronization is facilitated with a pulley-based loop with a pulley 246 in each seat support 178. The position (e.g., height) of each pulley 246 is fixedly secured within one of the tubes 198 and, thus, within one of the frame posts 146, 148 (FIGS. 1-6). As described below, each pulley 246 is mounted on one of the guide inserts 185.

In operation, the pulley 246 rotates within the tube 198 as the tube 198 changes position relative to the guide insert 185. The position of the tube 198 changes as a result of a fixed connection to the link cable 190 via a cable retainer 248 that snaps or otherwise engages the tube 198. In this example, the cable retainer 248 receives a cable pin or clasp 250 sized to engage one of the slots 204 in the tube 198 as the cable 190 loops over the pulley 246 as shown. The cable clasp 250 is crimped onto the cable 190 or otherwise fixed at a position along the cable 190, and need not be pin- or rod-shaped. The cable retainer 248 includes a block 252 shaped for insertion in the tube 198 to lock the pin 250 in the slot 204. The engagement of the block 252 and the tube 198 may include a snap- or press-fit arrangement or any other desired attachment. In this example, the block 252 includes a vertically oriented groove 254 through which the cable 190 passes, as well as clips 256 on either side of the groove 254 that may engage an interior projection (not shown) in the tube 198 to secure the cable retainer 248 in place.

In general, the pulleys 246 assist the rotation of the link cable 190, which, in turn, causes the displacement of the cable retainer 248 and, thus, the movement of the tube 198. Further details regarding how the movement of the seat supports 178 is synchronized via the cable 190 and, more generally, the link assembly 184, are provided below. Alternatively or additionally, the link assembly 184 includes one or more wheels or other non-pulley machines, both rotating and non-rotating, to facilitate the redirection or rotation of the link cable 190.

The lock-and-release mechanism of this example also includes and utilizes a track 258 formed in a vertically elongated body 260 of the guide insert 185 that extends upward from the base or lower end 186. The track 258 generally runs the length of the body 260 to provide a number of discrete positions at which the bolt 212 and, thus, the tube 198 can be located. To that end, the track 258 includes a number of notches 262 that act as stops along a vertical adjustment path 264 in which the bolt 212 can be received. In operation, each notch 262 generally works with the bolt 212 as a lock to maintain the position of the seat support 178. More specifically, the bolt 212 is shifted laterally into and out of one of the notches 262 via the action imparted by the button extension 216, at which point the bolt may move up or down the path 264 to one of the other notches 262. The bias force applied by the spring 218 will cause the bolt 212 to engage one of the notches 262 if the actuation force is no longer applied to the actuator button 194. As described further below, the higher notch (or notches) corresponds with a higher seat height level, as the seat riser 180 is carried upward by the bolt 212 via the openings 210 in the tube 198. The configuration and components of the above-described track-based lock mechanism can vary considerably, as desired.

A top end 266 of the guide insert 185 is generally directed to supporting the pulley 246 within the tube 198. To that end, the body 260 of the guide insert 185 may include a pair of laterally spaced plates 268 that terminate in finger-like projections at the top end 266 to form a recess or saddle 270. The plates 268 and the saddle 270 are configured to receive the pulley 246 in a manner that facilitates the rotation of the pulley 246 and the cable 190.

Figure 9:
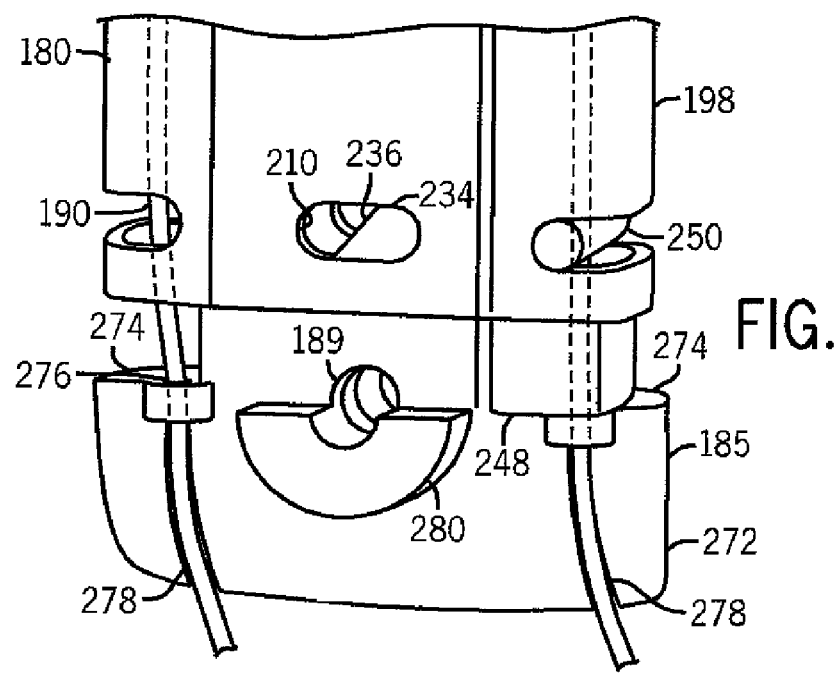
FIG. 9 is a perspective view of lower ends of the link assembly and the lock-and-release mechanism of the adjustable seat support of FIGS. 7 and 8 constructed in accordance with one or more aspects of the disclosure.

FIG. 9 shows portions of the guide insert 185, the riser post 182, and the link assembly 184 as assembled to illustrate the operation of the seat riser 180, the link assembly 184, and the lock-and-release mechanism in greater detail. The guide insert 185 has a wedge-shaped bottom 272 shaped to cooperate with the interior of one of the frame posts 146, 148 (FIGS. 1-6). At or near the bottom 272, the guide insert 185 has a platform or shelf 274 in which guide holes 276 are formed to receive the cable 190. Below each of the guide holes 276, the cable 190 is also retained in semi-circular grooves 278 formed in a face of the bottom 272 of the guide insert 185. Together, the guide holes 276 and grooves 278 can help establish or retain the tension in the cable loop by positioning the cable 190 in a consistent manner More generally, the guide holes 276 and the grooves 278 help to maintain a consistent engagement of the link 184, the adjustable seat supports 178, and the chassis 132 (FIGS. 1-4). The shelf 274 of the guide insert 185 may correspond with or establish the lowest seat height level possible, in the event that the cable retainer 248 rests upon the shelf 274 as shown.

The guide insert 185 is shown in FIG. 9 without the bolt 212 to depict the operation and positioning of the button extension 216 of the lock-and-release mechanism. Generally speaking, the bolt 212 is laterally re-positioned within the opening 210 in the tube 198 by the position of the translating coupler 234 of one of the strips 228, 230 (FIG. 8). In this case, the height of the coupler 234 is determinative of where the bolt 212 would reside within the angled slot 236 of the coupler 234. As shown, the actuation button 194 (FIGS. 7 and 8) has not been pressed by the caregiver, such that the bolt 212 is positioned within the opening 210 by the coupler 234 and the angled slot 236 toward the left hand side of the opening 210. This lateral position corresponds with the engagement of one of the notches 262 shown in FIG. 8. Once the button is pressed, the coupler 234 moves downward, moving the bolt 212 within the opening 210 laterally to the right as the bolt 212 follows the angled slot 236.

FIG. 9 also shows the aperture 189 through which the fastener 187 (FIG. 7) passes to secure the guide insert 185 to the chassis 132 (FIGS. 1-4). The bottom 272 of the guide insert 185 may have a semi-circular support shelf 280 to further engage the fastener 187 and thereby securely attach the guide insert 185 within the chassis 132.

Figure 10:
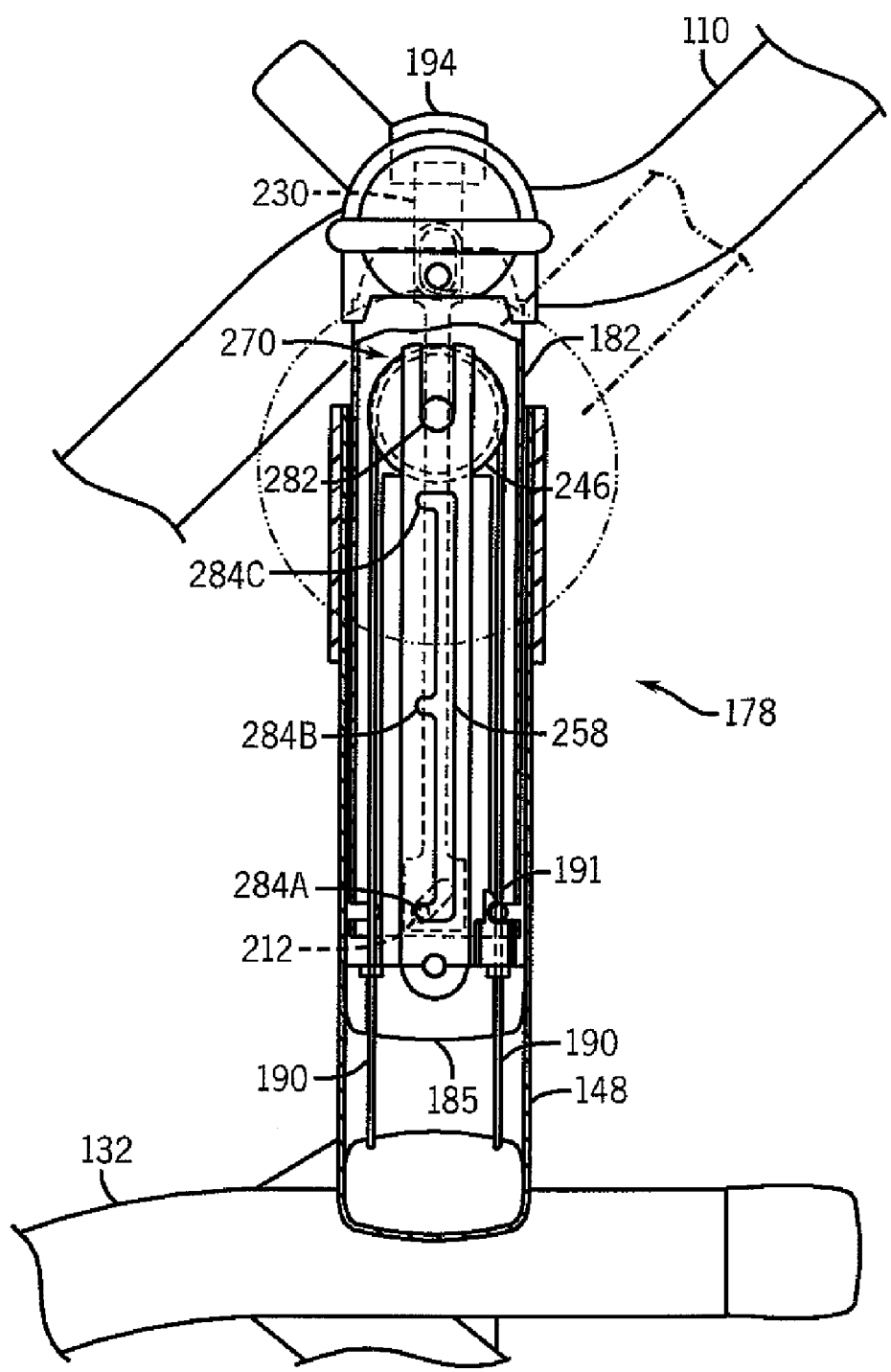
FIG. 10 is a partial, sectional view of the adjustable seat support to depict the link assembly and the lock-and-release mechanism at a lowered height level.

FIGS. 10 and 11 illustrate the above-described components of the adjustable seat supports 178 as assembled, with like numerals referencing common components. FIG. 10 depicts the adjustable seat support 178 at a lower seat height level, while FIG. 11 depicts the adjustable seat support 178 at a higher seat level. At the low level, the pulley 246 is inserted far upward into the riser post 182, as the riser post 182 significantly overlaps the guide insert 185. At the higher level, the riser post 182 has been moved upward relative to the guide insert 185 and the frame post 148. After the movement of the seat assembly 178 to displace the seat frame 110 relative to the chassis 132, the seat assembly 178 is then locked in at the new position as described further below.

The movement is synchronized in the other seat support 178 via the loop formed by the cable 190. As shown in FIG. 10, the cable position 191 and the cable retainer 248 are initially located near the lower end of the guide insert 185. As the riser post 182 is moved upward, the cable position 191 and the cable retainer 185 follow until reaching the location shown in FIG. 11 near the top of the frame post 148 and the pulley 246. Because the other seat support 178 has the same configuration of linking components, the upward displacements of the cable position 191, the cable retainer 185, and ultimately the riser post 182, are replicated.

FIGS. 10 and 11 also show that one of the components of the link assembly 184, i.e., the pulley 246, rests in a linearly stationary manner in the saddle 270 of the guide insert 185. To this end, the pulley 246 may include an axle 282 rotationally seated in the saddle 270. In this way, the pulley 246 is free to rotate with the cable loop but otherwise fixed relative to the guide insert 185 and the base frame or chassis 132. As a result, the link assembly 184 remains engaged with the chassis 132 during the height adjustments for stable and secure movement relative thereto. Alternatively, the pulley 246 may be attached to a different portion of the guide insert 185, or the pulley 246 may be fixed relative to the tube 198.

The manner in which the seat support 178 is locked in position at the two height levels is also depicted in FIGS. 10 and 11. In this example, the riser post 182 can be locked into three positions or height levels established via notches or stops 284A-284C along the track 258. At the lowest seat height level, the bolt 212 resides in the stop 284A (FIG. 10). At an intermediate height level, the bolt 212 resides in the stop 284B. The highest height level has the bolt 212 in the stop 284C (FIG. 11). In each position, the engagement of the bolt 212 in one of the track stops, together with the bias force of the actuator spring 218 (FIG. 8), lock the tube 182 in place.

To release the seat support 178 from the locked position, a downward force is applied to the button actuator 194, which, in turn, moves the extension strips 228 (FIG. 8) and 230 downward such that the slot 236 of the translating coupler 234 moves the bolt 212 laterally (e.g., rightward as shown in the drawings). As a result, the bolt 212 moves out of one of the stops and onto the vertical adjustment path 264, thereby allowing the bolt 212 to slide upward or downward to reach another stop along the track 258. Generally speaking, the seat support 178 is now released, permitting a caregiver to move the riser post 182 (and the seat frame 110) to a new level.

When the desired height level is reached, the lock-and-release mechanism is re-engaged once the force is no longer applied to the button actuator 194. Once the bolt 212 is riding on the path 264, the caregiver can release the button actuator 194, and the bias force of the spring 218 (FIG. 8) will move the translating coupler 234 upward and the bolt 212 laterally, once one of the notches or stops is encountered.

In the exemplary embodiment described above, the foregoing steps generally occur concurrently for both seat supports 178, each of which has a dedicated lock-and-release mechanism. While alternative embodiments may include only a single lock-and-release mechanism, the dual nature of the lock-and-release mechanism presents a number of operational and safety-related advantages. For example, when only one support 178 is released, the locked nature of the other support 178 prevents the riser post 182 from moving relative to the chassis 132 and the frame assembly 102. More specifically, the link assembly 184 (e.g., the cable 190) prevents one riser post 182 from moving unilaterally. Apart from the safety ramifications, preventing unilateral movement may, in turn, help avoid jamming of the seat support 178 once one side is displaced relative to the other side. Furthermore, the link assembly 184 works in conjunction with the two lock-and-release mechanisms to re-engage the side that was released. With the cable 190 under tension, the released side is not allowed to move enough to displace the bolt 212 vertically from the notch or stop. As a result, the released side will again lock into position once the force is no longer applied to the button actuator 194. In this way, the linked nature of the seat supports 178 prevents a child from sequentially disengaging the sides, with an unsafe transition state where one side is latched and the other side is not.

The foregoing safety and operational benefits are provided even when the seat supports 178 are under load. Indeed, the tension in the cable 190 increases with the load of a seated child occupant. It follows that the increased tension in the cable 190 will more effectively prevent any undesired, unilateral movement.

The tension in the cable 190, as installed, can vary. In some cases, the cable 190 need not be pre-loaded to be under much tension. In other cases, a significant amount of pre-loaded tension in the cable 190 may increase the friction in the synchronization loop. As a result, the seat supports 178 would be more difficult to move, especially when under the load of a child occupying the seat. As a result, the child may be unable to change the seat even if the seat supports were released from the locked position(s).

Figure 12:
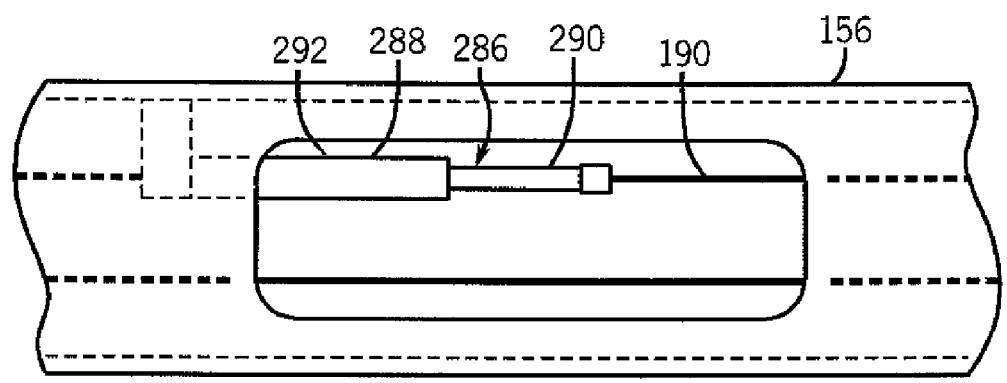
FIG. 12 is a top view of a power assistance mechanism of a seat support assembly constructed in accordance with one aspect of the disclosure.

FIG. 12 illustrates an embodiment in which an energy storage device 286 is introduced into the synchronization loop to both assist upward adjustments and deter undesirably rapid downward adjustments. In this case, the energy storage device 286 includes a pneumatic cylinder 288 mounted within the brace 156 and integrated in the synchronization loop through attachments to the cable 190. More specifically, the cable 190 is attached to a piston or plunger 290 that reciprocates within a column 292 secured to the brace 156. The pneumatic cylinder 288 is positioned and oriented in a manner that energy is stored when the cable 190 moves in a direction that lowers the seat level. As a result, the pneumatic cylinder 288 applies a return force to release the stored energy when the cable 190 moves in the opposite direction, thereby assisting the caregiver in raising the seat level. In that way, the device 286 regulates and controls the downward movement, thereby avoiding abrupt drops, while assisting upward movement. When the seat supports are under the load of a seated child, the weight of the child can help compress the fluid within the cylinder 288.

The energy storage device 286 may vary considerably from the example shown, as desired. In addition to pneumatic devices configured as a gas strut or gas spring, the device 286 may include a variety of mechanical devices that store energy for later applied force. One example is a constant force spring. The location and number of devices storing and applying energy may also vary from the example shown, which may be useful if smaller devices are used to accommodate the limited space within the brace 156.

In some cases, a single actuator for the multiple seat supports may be coupled to, or incorporated with, the energy storage device 286. This single control element arrangement may reduce system complexity and also allow the actuator to be more conveniently and/or desirably located.

Figure 13:
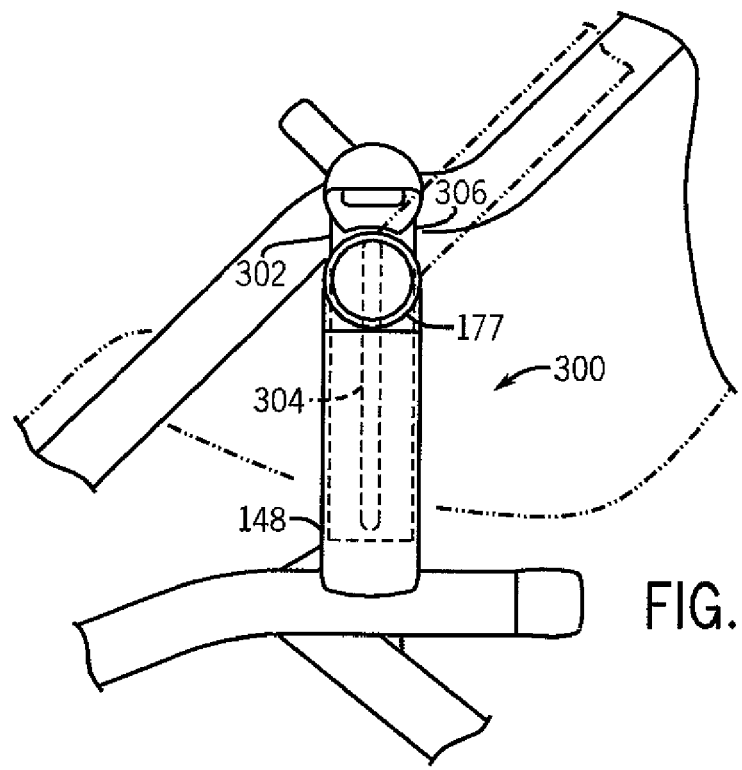
FIG. 13 is an elevational, side, and partial view of a stroller having an adjustable seat support constructed in accordance with an alternative embodiment.
Figure 14:
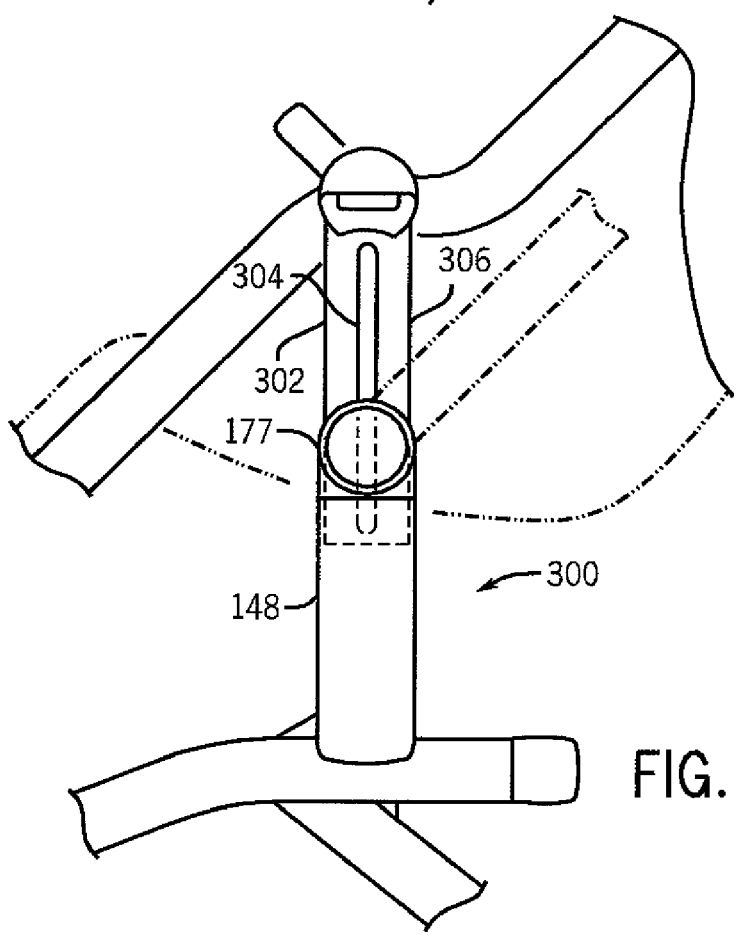
FIG. 14 is an elevational, side, and partial view of the adjustable seat support of FIG. 13 after adjustment to a raised height level.

FIGS. 13 and 14 show an alternative seat support assembly 300 in lower and raised seat height positions, respectively. In this case, each seat support 300 has a riser post 302 with a track or slot 304. As in the examples described above, the riser post 302 may be formed from extruded aluminum or any other material(s) providing sufficient structural support. The slot 304 is vertically elongated along a central axis, such that the riser post 302 may include a split tube 306. The slot 304 allows a rivet 307 (FIG. 15) for securing the handle hub 177 to the frame post 148 to pass through the riser post 302 regardless of the seat height level. As a result, the same rivet used to secure the handle hub 177 can also be used to secure a stationary guide 308 (FIG. 15) inserted into the frame post 148. The rivet 187 of the embodiment described above in connection with FIG. 7 would no longer be needed. The installation of the seat support would be further simplified due to the greater accessibility of the upper rivet location.

Figure 15:
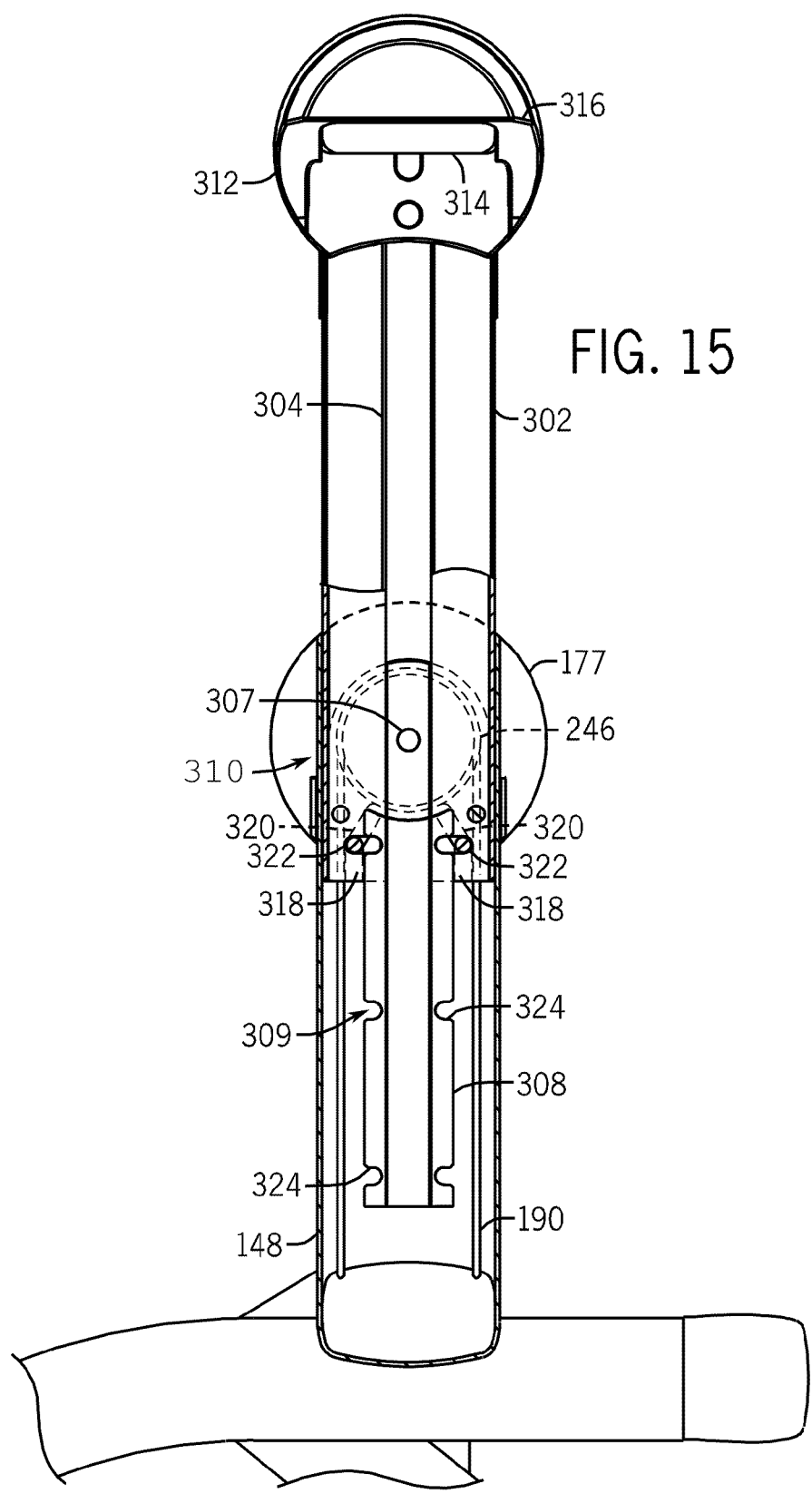
FIG. 15 is a sectional view of the adjustable seat support of FIG. 13 to depict a link assembly and a lock-and-release mechanism thereof in greater detail.

FIG. 15 illustrates the internal components of the seat support assembly 300, including an alternative lock-and-release mechanism 309 and an alternative link assembly 310. In this example, an actuator mount 312 of the lock-and-release mechanism 309 has a button actuator 314 that protrudes downward from a cap 316. The caregiver therefore applies an upward force on the actuator 314 to release the seat support 300. In these examples, the actuator 314 may be extended downward via strips, rods or other elongated elements either integrally formed with the tube 302 or otherwise running with the separated sides thereof. The extension of the actuator 314 terminates with a pair of translating couplers 318, each having an angled slot 320 to drive a corresponding pair of pins or bolts 322 laterally. The bolts 322 can thus exit notches or stops 324 located along the stationary guide insert 308.

In this example, the pulley 246 is concentrically mounted with the handle hub 177 using the rivet 307 used to secure the handle hub 177 and, more generally, the guide insert 308. In this way, the pulley 246 is axially mounted relative to the split riser tube 302, resting within the track 304 thereof. In operation, the handle hub 177, the guide insert 308, and the pulley 246 remain stationary, riding the track 304 during the movement of each adjustment.

The cable 190 may be secured and utilized in the manner described above in connection with the embodiment of FIGS. 10 and 11. More specifically, a cable pin and/or retainer (not shown) can be used to secure the cable 190 to the riser post 302 and effectuate the synchronization.

Alternative embodiments may utilize or incorporate the pin-based lock-and-release assembly described in co-pending, commonly assigned U.S. application Ser. No. 11/756, 702, referenced above. Still further suitable alternative configurations may utilize brackets, clamps and other fasteners that may be released or otherwise adjusted to permit the movement underlying the seat level adjustments. Such alternatives may be useful in situations where a continuum of seating height levels is desirable. Other embodiments may involve one or more rods or bolts that engage holes formed in the frame tubing. In these and other cases, the frame tubing and other components in sliding relationship during the height level adjustment need not be telescoping, but rather may be disposed in a variety of alternative configurations or arrangements. For these reasons, the lock(s) used to maintain the desired seat level may vary considerably from the examples described above, and may take a variety of forms.

The components of the seat support assemblies described above may be composed of a variety of materials, including, for instance, strong, durable plastics, metal, and the like. Materials may generally be selected in accordance with the degree to which the component provides structural support.

The frame assembly 102 and other components of the stroller 100 may also be adapted to facilitate reconfiguration between one or more operational, or in-use, orientations and one or more folded orientations in which the stroller 100 is disposed in a convenient, compact arrangement. Further details regarding the folding mechanisms of the stroller may be found in the co-pending, commonly assigned U.S. application Ser. No. 11/831,430, referenced above.

The synchronized height adjustment of the strollers described herein address a number of functional and safety challenges with dual seat supports or posts that are linked such that synchronized movement of the supports can occur relative to a chassis or base frame. To this end, the above-described synchronization links or link assemblies adjust the positions of a pair of risers an equal distance to mirror the movement resulting from a user imparting force on one or both of the posts. This synchronized motion results in a seat height adjustment without jamming, as each seat support need not to be adjusted separately or independently. The movement is mirrored to adjust the sides at the same rate, thereby minimizing angular deflection between the two sides. As a result, clearances on the sliding surfaces described above can be decreased, thereby providing a more robust construction and a tighter feel during the adjustments. Despite these improvements, the seat height adjustments are accomplished with components that are largely internal, arranged in a compact configuration, and conveniently located for caregiver control, yet safe in the presence of the child occupant.

Although certain strollers have been described herein in accordance with the teachings of the present disclosure, the scope of coverage of this patent is not limited thereto. On the contrary, this patent covers all embodiments of the teachings of the disclosure that fairly fall within the scope of permissible equivalents. While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention. The foregoing description is given for clearness of understanding only, and no unnecessary limitations should be understood therefrom, as modifications within the scope of the invention may be apparent to those having ordinary skill in the art.

What is claimed is:

1. A stroller comprising:
a frame assembly;
a seat supported by the frame assembly;
first and second adjustable seat supports engaged with the frame assembly to support the seat in a position relative to the frame assembly; and
a synchronization link coupling the first and second adjustable seat supports wherein the synchronization link mirrors a movement of the first adjustable seat support in a corresponding movement of the second adjustable seat support to adjust the position of the seat
wherein the synchronization link comprises a cable fixedly attached at first and second positions to the first and second adjustable seat supports, respectively.

2. The stroller of claim 1, wherein each of the first and second adjustable seat supports comprises a riser post slidably engaged with the frame assembly.

3. The stroller of claim 2, wherein the frame assembly comprises first and second posts slidably engaged with the riser posts of the first and second adjustable seat supports in respective telescopic arrangements.

4. The stroller of claim 1, wherein the link comprises a pulley-based loop coupling the first and second adjustable seat supports.

5. The stroller of claim 1, wherein the synchronization link is disposed within the frame assembly.

6. The stroller of claim 1, further comprising an energy storage device coupled to the synchronization link to regulate the movement.

7. The stroller of claim 6, wherein the energy storage device comprises a pneumatic cylinder secured to the frame assembly.

8. A stroller comprising:
a chassis;
a seat supported by the chassis;
first and second seat supports coupled to the chassis to adjustably support the seat in a position relative to the chassis;
first and second locks engaging the first and second seat supports, respectively, to secure the position of the seat, wherein the first and second locks are independently released relative to one another to allow the first and second seat supports to change the position of the seat; and
a link coupling the first and second seat supports to prevent movement of the first seat support and the second seat support when only one of the first and second locks is released.

9. The stroller of claim 8, wherein the link comprises a cable loop disposed within the chassis.

10. The stroller of claim 9, wherein a cable of the cable loop is fixedly attached at first and second positions to the first and second seat supports, respectively.

11. The stroller of claim 8, wherein each of the first and second seat supports comprises a riser post slidably engaged with the chassis.

12. The stroller of claim 11, wherein the chassis comprises first and second posts slidably engaged with the riser posts of the first and second seat supports in respective telescopic arrangements.

13. The stroller of claim 12, wherein each riser post comprises a tube in which one of the first and second locks is disposed.

14. The stroller of claim 8, wherein the link comprises a pulley-based loop coupling the first and second seat supports.

15. The stroller of claim 8, further comprising a pneumatic cylinder secured to the frame assembly and coupled to the link to regulate movement of the first and second seat supports.

16. A stroller comprising:
a frame assembly;
a seat supported by the frame assembly;
first and second adjustable seat supports engaged with the frame assembly to support the seat in a position relative to the frame assembly; and
a synchronization link coupling the first and second adjustable seat supports wherein the synchronization link mirrors a movement of the first adjustable seat support in a corresponding movement of the second adjustable seat support to adjust the position of the seat,
wherein the synchronization link comprises a comprises a pulley-based loop coupling the first and second adjustable seat supports.

17. A stroller comprising:
a chassis;
a seat supported by the chassis;
first and second seat supports coupled to the chassis to adjustably support the seat in a position relative to the chassis;
first and second locks engaging the first and second seat supports, respectively, to secure the position of the seat, wherein the first and second locks are released to allow the first and second seat supports to change the position of the seat; and
a link coupling the first and second seat supports to prevent movement of the first seat support and the second seat support when only one of the first and second locks is released,
wherein the link comprises a cable loop disposed within the chassis.

18. A stroller comprising:
a chassis;
a seat supported by the chassis;
first and second seat supports coupled to the chassis to adjustably support the seat in a position relative to the chassis;
first and second locks engaging the first and second seat supports, respectively, to secure the position of the seat, wherein the first and second locks are released to allow the first and second seat supports to change the position of the seat; and
a link coupling the first and second seat supports to prevent movement of the first seat support and the second seat support when only one of the first and second locks is released,
wherein the link comprises a pulley-based loop coupling the first and second seat supports.

* * * * *